United States Patent
Lee et al.

(10) Patent No.: US 12,355,056 B2
(45) Date of Patent: Jul. 8, 2025

(54) APPARATUS FOR MANUFACTURING ELECTRODE ASSEMBLY, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Byeong Kyu Lee, Daejeon (KR); Su Taek Jung, Daejeon (KR); Soon Kwan Kwon, Daejeon (KR); Hyun Kyung Shin, Daejeon (KR); Won Nyeon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 759 days.

(21) Appl. No.: 17/610,773

(22) PCT Filed: May 12, 2020

(86) PCT No.: PCT/KR2020/006228
§ 371 (c)(1),
(2) Date: Nov. 12, 2021

(87) PCT Pub. No.: WO2020/231149
PCT Pub. Date: Nov. 19, 2020

(65) Prior Publication Data
US 2022/0069276 A1    Mar. 3, 2022

(30) Foreign Application Priority Data
May 14, 2019   (KR) .................. 10-2019-0056443

(51) Int. Cl.
H01M 4/04       (2006.01)
B32B 37/00      (2006.01)
H01M 10/04      (2006.01)

(52) U.S. Cl.
CPC ....... *H01M 4/0435* (2013.01); *B32B 37/0046* (2013.01); *H01M 10/0404* (2013.01); *H01M 10/0468* (2013.01)

(58) Field of Classification Search
CPC ............... H01M 4/0435; H01M 10/04; H01M 10/0468; B32B 37/0046
See application file for complete search history.

(56) References Cited

U.S. PATENT DOCUMENTS

2008/0159842 A1    7/2008   Kang et al.
2009/0311581 A1    12/2009  Park et al.
(Continued)

FOREIGN PATENT DOCUMENTS

CN    104106171 A    10/2014
CN    105849961 A    8/2016
(Continued)

OTHER PUBLICATIONS

Extended European Search Report for European Application No. 20806818.9, dated May 18, 2022.
(Continued)

*Primary Examiner* — George R Koch
(74) *Attorney, Agent, or Firm* — Birch, Stewart, Kolasch & Birch, LLP

(57) ABSTRACT

Discussed are an apparatus for manufacturing an electrode assembly, an electrode manufactured therethrough, and a secondary battery. The apparatus includes an upper and lower roll to press upper and lower portions of the stack, respectively; an upper support part to support the upper roll; a mover to allow the upper support part to move; a lower support to support both sides of the lower roll; a pressure detector provided on the lower support to measure a pressure applied to the lower roll, thereby detecting a pressure applied to the stack; and a controller to adjust the pressure
(Continued)

applied to the stack by reflecting a pressure detection value detected in the pressure detector, the pressure detector comprising a first pressure detector to detect pressure applied to one side of the lower roll; and a second pressure detector to detect pressure applied to the other side of the lower roll.

14 Claims, 5 Drawing Sheets

(56) References Cited

U.S. PATENT DOCUMENTS

| | | | |
|---|---|---|---|
| 2014/0154565 A1* | 6/2014 | Ku | H01M 50/461 429/246 |
| 2015/0013720 A1 | 1/2015 | Yasooka et al. | |
| 2016/0276701 A1 | 9/2016 | Sale et al. | |
| 2018/0366760 A1* | 12/2018 | Shimomura | H01M 8/2404 |

FOREIGN PATENT DOCUMENTS

| | | |
|---|---|---|
| CN | 109103485 A | 12/2018 |
| CN | 208539012 U | 2/2019 |
| CN | 208939095 U | 6/2019 |
| JP | 9-213726 A | 8/1997 |
| JP | 2009-357507 A | 12/2000 |
| JP | 2006-175501 A | 7/2006 |
| JP | 2006-179401 A | 7/2006 |
| JP | 2007-75840 A | 3/2007 |
| JP | 2009-283241 A | 12/2009 |
| JP | 2013-36768 A | 2/2013 |
| JP | 5328876 B2 | 10/2013 |
| KR | 10-0784444 B1 | 12/2007 |
| KR | 10-2011-0017294 A | 2/2011 |
| KR | 10-2012-0095160 A | 8/2012 |
| KR | 10-2014-0015647 A | 2/2014 |
| KR | 10-2014-0121128 A | 10/2014 |
| KR | 10-2015-0031074 A | 3/2015 |
| KR | 10-2016-0085841 A | 7/2016 |
| KR | 10-1888052 B1 | 8/2018 |
| KR | 10-1940524 B1 | 1/2019 |
| WO | WO-2019066383 A1 * | 4/2019 ........ H01M 10/0404 |

OTHER PUBLICATIONS

International Search Report (PCT/ISA/210) issued in PCT/KR2020/006228 mailed on Aug. 27, 2020.

* cited by examiner

APPARATUS FOR MANUFACTURING ELECTRODE ASSEMBLY, ELECTRODE ASSEMBLY MANUFACTURED THERETHROUGH, AND SECONDARY BATTERY

The present application is 371 of PCT/KR2020/006228, filed on May 12, 2020.

CROSS-REFERENCE TO RELATED APPLICATION

The present application claims the benefit of the priority of Korean Patent Application No. 10-2019-0056443, filed on May 14, 2019, which is hereby incorporated by reference in its entirety.

TECHNICAL FIELD

The present invention relates to an apparatus for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the case of the stacked type electrode assembly according to the related art, the electrode assembly may be manufactured through a lamination in which heat and a pressure are applied to a stack of an electrode and a separator while the stack passes between a pair of rollers.

Here, in order to adjust the pressure applied to the stack of the electrode and the separator, an upper roller moves to a lower roller to adjust the pressure. That is, a pressure actually applied to the stack changes by a distance between the rollers, a weight of each of the rollers, and a thickness of the stack. Thus, it is impossible to apply a uniform pressure to the stack always.

The reason is that the thickness of the stack is not uniform always, the distance between the rollers changes due to thermal expansion of the upper and lower rollers through heat transfer between the upper and lower rollers by the heat applied to the stack, which is applied to perform the process, and the pressure applied to the upper roller and the pressure applied to the stack change always.

For this reason, there is a problem that it is difficult to achieve the purpose of realizing the uniform quality (adhesion strength).

[Prior Art Document]: (Patent Document) Korean Patent Publication No. 10-2014-0015647

DISCLOSURE OF THE INVENTION

Technical Problem

One aspect of the present invention is to provide an apparatus for manufacturing an electrode assembly, an electrode and a separator are uniformly bonded to each other when the stack of the electrode and the separator are laminated to manufacture an electrode assembly, and an electrode assembly manufactured therethrough, and a secondary battery.

Technical Solution

An apparatus for manufacturing an electrode assembly, in which a stack of an electrode and a separator is laminated to manufacture an electrode assembly, according to an embodiment of the present invention comprises an upper roll and a lower roll, which are configured to press upper and lower portions of the stack, respectively, an upper support part configured to support the upper roll, a moving part configured to allow the upper support part to move, a lower support part configured to support both sides of the lower roll, a pressure detection part provided on the lower support part to measure a pressure applied to the lower roll, thereby detecting a pressure applied to the stack, and a control part configured to adjust the pressure applied to the stack by reflecting an pressure detection value detected in the pressure detection part, wherein the pressure detection part comprises a first pressure detection part configured to detect a pressure applied to one side of the lower roll; and a second pressure detection part configured to detect a pressure applied to the other side of the lower roll.

Advantageous Effects

According to the present invention, when the stack of the electrode and the separator is bonded through the lamination, the pressure of the portion disposed at a portion at the lower portion of the stack to adjust the pressing force applied to the stack, thereby uniformly pressing the stack, and thus, the uniform bonding of the stack may be realized.

Here, the pressures at both the sides of the lower roll disposed below the lower portion of the stack may be detected to adjust the distance between the upper roll and the lower roll in the control part. Therefore, the more uniform pressure may be applied to the stack to realize the uniform quality and adhesion strength.

MODE FOR CARRYING OUT THE INVENTION

Figure 1:
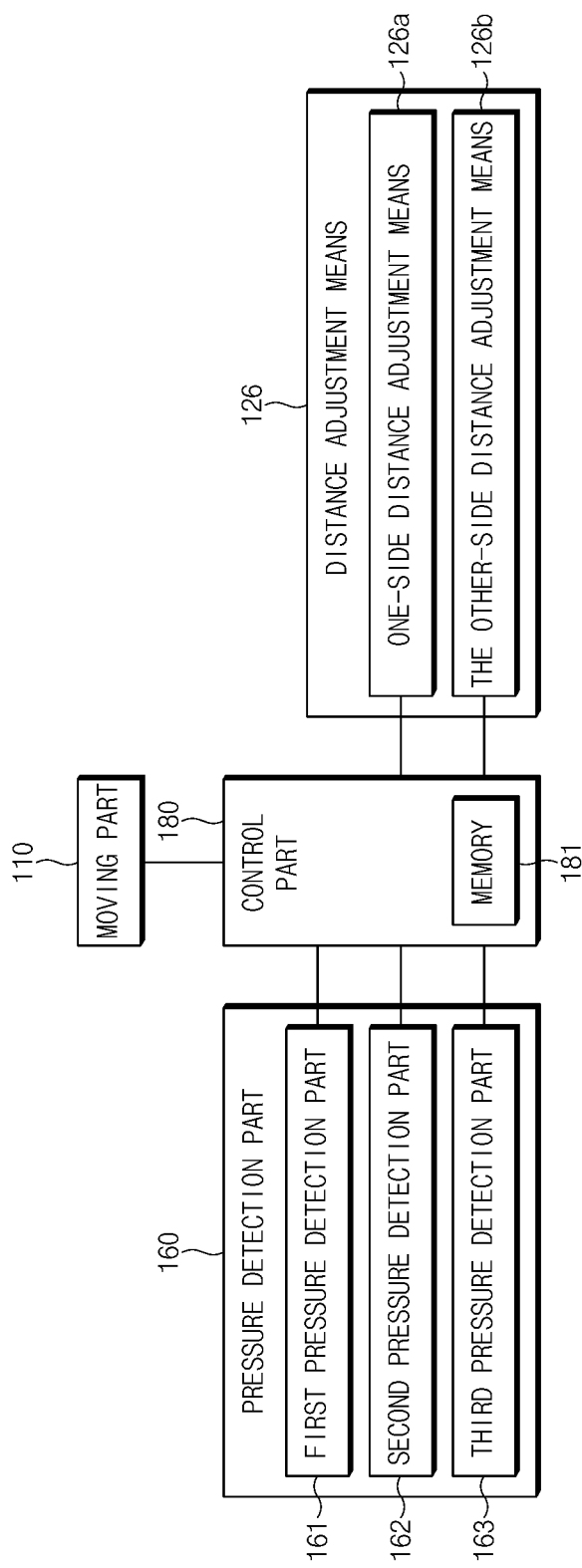
FIG. 1 is a conceptual block diagram of an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
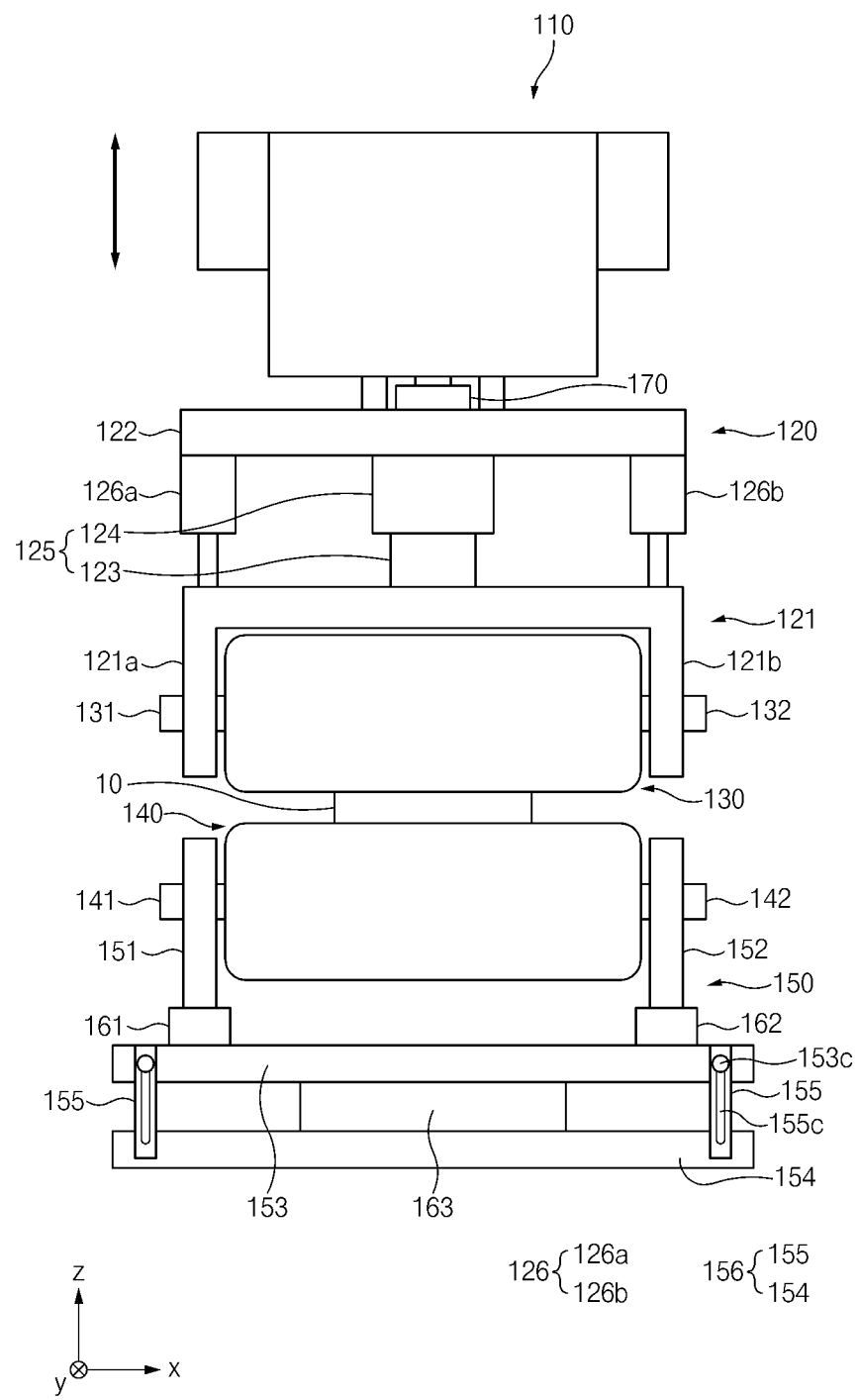
FIG. 2 is a front view illustrating the apparatus for manufacturing the electrode assembly according to an embodiment of the present invention.

FIG. 1 is a conceptual block diagram of an apparatus for manufacturing an electrode assembly according to an embodiment of the present invention, and FIG. 2 is a front view illustrating the apparatus for manufacturing the electrode assembly according to an embodiment of the present invention.

Referring to FIGS. 1 and 2, an apparatus for manufacturing an electrode assembly according to an embodiment of the present invention may comprise an upper roll 130 and a lower roll 140, which press upper and lower portions of a stack 10, an upper support part 120 supporting the upper roll 130, a moving part 110 allowing the upper support part 120 to move, a lower support part 150 supporting both sides of the lower roll 140, a pressure detection part 160 measuring a pressure applied to the lower roll 140, and a control part 180 adjusting a pressure applied to or along the stack 10.

Figure 3:
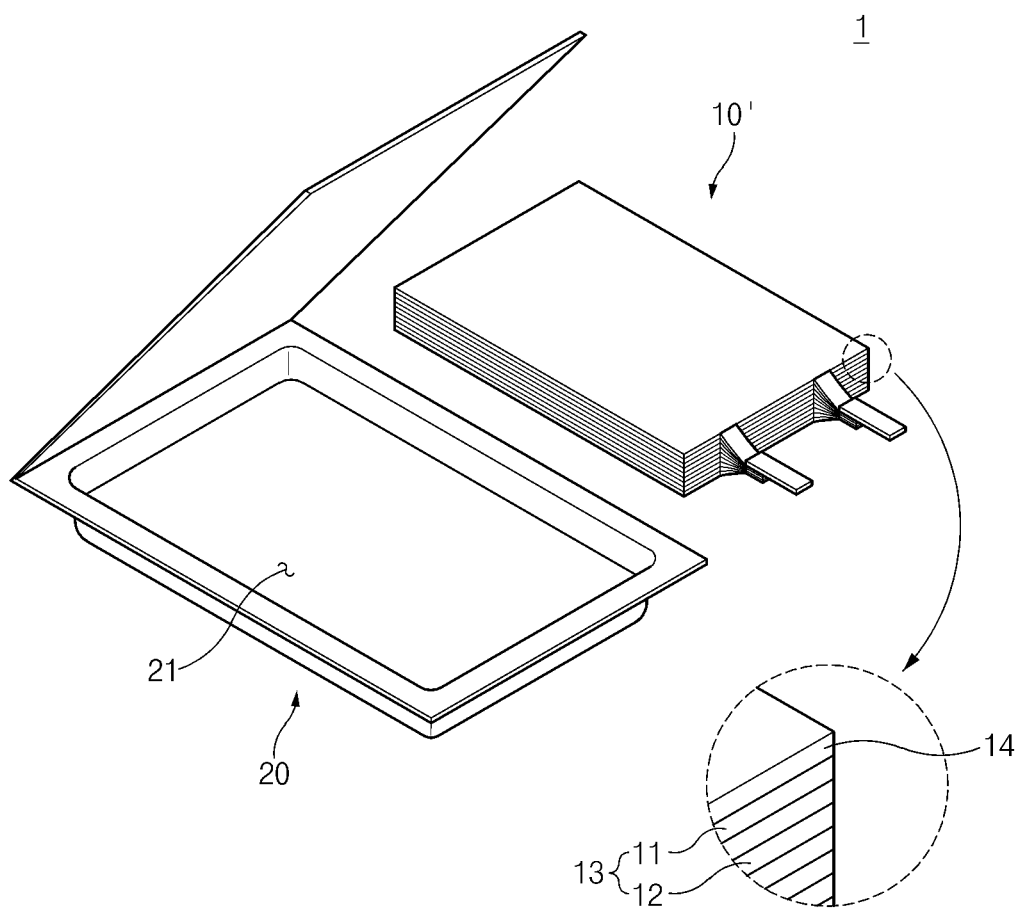
FIG. 3 is a perspective view exemplarily illustrating an electrode assembly manufactured through the apparatus for manufacturing the electrode assembly and a secondary battery comprising the electrode assembly according to an embodiment of the present invention.

FIG. 3 is a perspective view exemplarily illustrating an electrode assembly manufactured through the apparatus for manufacturing the electrode assembly and a secondary battery comprising the electrode assembly according to an embodiment of the present invention.

Hereinafter, the apparatus for manufacturing the electrode assembly according to an embodiment of the present invention will be described in more detail with reference to FIGS. 1 to 5.

Referring to FIGS. 2 and 3, the apparatus for manufacturing the electrode assembly according to an embodiment of the present invention may be an electrode assembly manufacturing apparatus that laminates the stack 10 of the electrode 13 and the separator 14 to manufacture an electrode assembly 10'.

The electrode assembly 10' may be a chargeable and dischargeable power generation element and have a shape in which the electrode 13 and the separator 14 are alternately stacked to be assembled with each other.

The electrode 13 comprises a positive electrode 11 and a negative electrode 12. Here, the positive electrode 11, the separator 14, and the negative electrode 12 may be alternately disposed.

The positive electrode 11 may comprise a positive electrode collector and a positive electrode active material applied to the positive electrode collector. For example, the positive electrode collector may be provided as a foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode 12 may comprise a negative electrode collector and a negative electrode active material applied to the negative electrode collector. For example, the negative electrode collector may be provided as a foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

Also, the separator 14 may be made of an insulating material and a flexible material. Here, the separator 14 may be made of, for example, a polyolefin-based resin film such as polyethylene or polypropylene having micropores.

Figure 4:
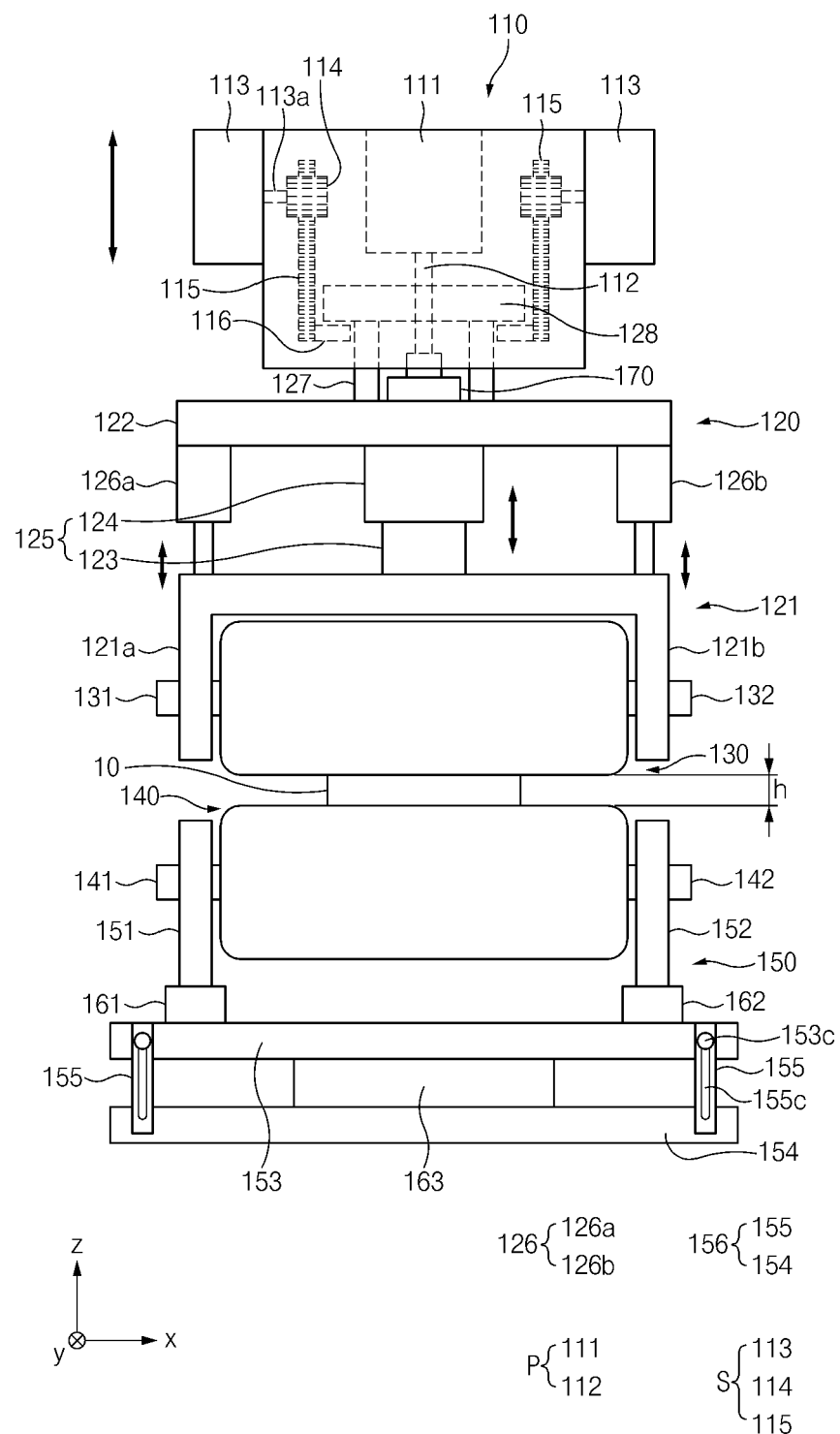
FIG. 4 is a conceptual front view exemplarily illustrating the apparatus for manufacturing the electrode assembly according to an embodiment of the present invention.

FIG. 4 is a conceptual front view exemplarily illustrating the apparatus for manufacturing the electrode assembly according to an embodiment of the present invention. Here, FIG. 4 exemplarily illustrates the moving part 110 when viewed from a front side.

Referring to FIGS. 2 to 4, the upper roll 130 and the lower roll 140 may press the upper and lower portions of the stack 10 of the electrode 130 and the separator 14.

Also, the upper roll 130 and the lower roll 140 may continuously laminate a plurality of stacks 10 while rotating.

Furthermore, for example, each of the upper roll 130 and the lower roll 140 may be provided with a heater therein to transfer heat heated through the heater to the stack 10.

The upper roll 130 may be in contact with a top surface of the stack 10, and the lower roll 140 may be in contact with a bottom surface of the stack 10. Here, for example, the upper roll 130 may move in a direction of the lower roll 140 to press the stack 10.

The upper support part 120 may support the upper roll 130. Here, the upper support part 120 may be disposed in an upward direction of the upper roll 130 to rotatably support the upper roll 130.

Also, the upper support part 120 may comprise an upper roll support body 121 coupled to both sides of the upper roll 130, a movable block 122 disposed to be spaced a predetermined distance upward from the upper roll support body 121, a connection part 125 connecting the movable block 122 to the upper roll support body 121, and a distance adjustment means 126 mounted on both sides of a lower portion of the movable block 122 and coupled to both sides of the upper roll support body 121.

The upper roll support body 121 may comprise one portion 121a rotatably supporting one side 131 of the upper roll 130 and the other portion 121b rotatably supporting the other side 132.

The connection part 125 may comprise a block connection part 124 disposed below the movable block 122 and a support connection part 123 disposed above the upper roll support body 121.

The distance adjustment means 126 may comprise one-side distance adjustment means 126a coupled to the one portion 121a of the upper roll support body 121 and the other-side distance adjustment means 126b coupled to the other portion 121b.

Each of the one-side distance adjustment means 126a and the other-side distance adjustment means 126b may be provided as, for example, an actuator. Here, the actuator may be specifically provided as, for example, a pneumatic actuator or a hydraulic actuator.

The upper support part 120 may further comprise an upper support 127 extending upward from an upper end of the movable block 122 and an upper block 128 provided at an upper end of the upper support 127.

The moving part 110 may move the upper support part 120. Here, the moving part 110 may be connected to an upper side of the upper support part 120 to allow the upper support part 120 to move so that the upper roll 130 moves vertically.

Also, the moving part 110 may comprises a vertical moving means S and a pressing means P so that the upper support 120 moves or is pressed to allow the upper roll 130 to move or be pressed. Here, the upper support part 120 may move by the vertical moving means S to allow the upper roll 130 to be in contact with the stack 10, and the pressure applied to the upper roll 130 may be adjusted by the pressing means P to adjust pressing force applied to the stack 10.

The pressing means P may comprise a cylinder 111 to press the upper support part 120 through a pressure of the cylinder 111, thereby pressing the stack 10 through the upper roll 130 supported on the upper support part 120. Here, the pressing means P may further comprise a moving shaft 112 provided at a lower end of the cylinder 111 to allow the moving shaft 112 to vertically move through the pressure of the cylinder 111, thereby adjusting the pressing force. Here, for example, the cylinder 111 and the moving shaft 112 may constitute an actuator.

The vertical moving means S may allow the upper support part 120 to move in the vertical direction or support the upper support part 120 to be disposed at a predetermined height. Here, the vertical moving means S may perform only the function of the moving means for allowing the upper support part 120 to move in the vertical direction or may additionally perform the function of adjusting the pressing force while the upper support part 120 moves in the vertical direction.

The vertical moving means S may comprise, for example, a driving motor 113, a pinion gear 114 coupled to a rotation shaft 113a of the drive motor 113, and a rack gear 115 engaged with the pinion gear 114. Here, the driving motor 113 may be provided as a servo-motor or a step motor. Here, when the rotation shaft 113a rotates by an operation of the drive motor 113, the pinion gear 114 mounted on the rotation shaft 113a rotates. As a result, the rack gear 115 may move vertically to allow the upper support part 120 to move. Also, a seating part 116 on which an end of the upper block 128 is seated may be disposed to protrude from an end of the rack gear 115 and support the upper block 128, thereby supporting the upper support part 120. Here, when the rack gear 115 moves upward, the upper block 128 of which the end is seated on the seating part 116 may move upward to allow the upper support part 120 to move.

Also, for another example, the vertical moving means S may comprise a rotation motor, a screw shaft rotating by the rotation motor and having an outer circumferential surface on which a screw part is disposed, and a coupling block coupled to the screw shaft and having a screw groove, which corresponds to the screw part of the screw shaft, in an inner circumferential surface thereof. Here, the upper support part 120 may be connected to the coupling block. Thus, when the screw shaft rotates by the rotation motor, the coupling block may move vertically to allow the upper support part 120 to move vertically. Here, in the upper support part 120, the upper block 128 may be connected to the coupling block. (Since a technique in which the screw shaft rotates by the rotation motor to allow the coupling block coupled to the screw shaft to rotate is the well-known technique, detailed description thereof will be omitted.)

Figure 5:
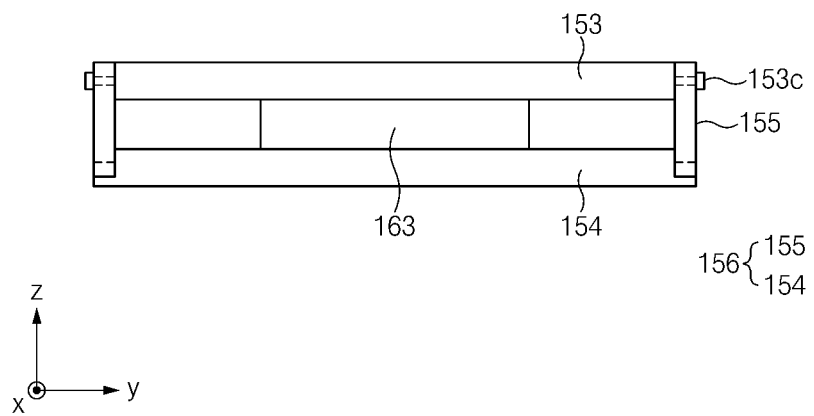
FIG. 5 is a right view illustrating a third support part and a fourth support part in the apparatus for manufacturing the electrode assembly according to an embodiment of the present invention.

FIG. 5 is a right view illustrating a third support part and a fourth support part in the apparatus for manufacturing the electrode assembly according to an embodiment of the present invention.

Referring to FIGS. 4 and 5, the lower support part 150 may support both sides of the lower roll 140.

The lower support part 150 may comprise a first support part 151 supporting one side 141 of the lower roll 140 and a second support part 152 supporting the other side 142 of the lower roll 140. Also, the lower support part 150 may further comprise a third support part 153 supporting lower portions of the first support part 151 and the second support part 152 and a fourth support part 156 supporting a lower portion of the third support part 153.

The fourth support part 156 may further comprise a base block 154 disposed under the third support part 153 and a guide means 155 provided in plurality between the base block 154 and the third support part 153 to guide vertical movement of the third support part 153.

The guide means 155 may be provided as a guide block in which a guide hole 155c is defined in a vertical direction. Here, a guide protrusion 153c protruding from an end of the third support part 153 may be coupled to the guide hole 155c so that the guide protrusion 153c is guided to move along the guide hole 155c.

The pressure detection part 160 may be disposed on the lower support part 150 to measure a pressure applied to the lower roll 140, thereby detecting a pressure applied to the stack 10.

The pressure detection part 160 may comprise a first pressure detection part 161 detecting a pressure applied to one side of the lower roll 140 and a second pressure detection part 162 detecting a pressure applied to the other side of the lower roll 140.

The pressure detection part 160 may further comprise a third pressure detection part 163 extracting the total pressure applied to the stack 10 through the detection of the pressure applied to the third support part 153.

The first pressure detection part 161 may detect a pressure applied to the first support part 151, and the second pressure detection part 162 may detect a pressure applied to the second support part 152.

The first pressure detection part 161 may be disposed between the first support part 151 and the third support part 153 in the vertical direction, and the second pressure detection part 162 may be disposed between the second support part 152 and the third support 153 in the vertical direction.

The third pressure detection part 163 may be disposed between the third support 153 and the base block 154.

Each of the first pressure detection part 161, the second pressure detection part 162, and the third pressure detection part 163 may comprise a load cell. Here, the load cell may be deformed to be compressed or stretched when a weight is applied thereto, and an amount of deformation may be detected to measure a pressure.

Referring to FIGS. 1 and 4, the control part 180 may adjust the pressure applied to the stack 10 by reflecting the pressure detection value detected by the pressure detection part 160.

Also, for example, the control part 180 may allow the upper roll 130 to move vertically through the moving part 110 so as to adjust the pressure applied to the stack 10 disposed between the upper roll 130 and the lower roll 140. Here, for a specific example, the control part 180 may adjust the pressing force applied to the upper roll 130 through the pressing means P after the upper roll 130 moves vertically through the vertical moving means S of the moving part 110 to contact the stack, thereby adjusting the pressure applied to the stack 10 disposed between the upper roll 130 and the lower roll 140.

Here, the control part 180 may control an operation of the driving motor 113 of the vertical moving means S and control an operation of the cylinder 111 of the pressing means P to control pressing force of the upper roll 130.

For example, the control part 180 may control the vertical movement and the pressing force of the upper roll 130 through the moving part 110 on the basis of data stored in a memory 181 according to the pressure detection value transmitted from the pressure detection part 160 so that a uniform pressure is applied to the stack 10 through the upper roll 130.

Furthermore, for example, the control part 180 may receive the pressure value from the third pressure detection part 163 to adjust the pressure applied to the stack 10 through the moving part 110 so that the uniform pressure is applied to the stack 10. Here, the control part 180 may determine a pressure except for a self-weight of each of devices (structures) disposed above the third pressure detection part 163 as the pressing force applied to the stack to control the moving part 110 on the basis of the pressing force, thereby the pressure applied to the stack 10.

Also, the control part 180 may receive one-side pressure value and the other-side pressure value of the lower roll 140, which are detected from the first pressure detection part 161 and the second pressure detection part 162, to control the one-side distance adjustment means 126a and the other-side distance adjustment means 126b so that the uniform pressure is applied to the stack 10, thereby adjusting distances h between the one side and the other sides of the upper roll 130 and the lower roll 140. That is, a distance between the one side 131 of the upper roll 130 and the one side 141 of the lower roll 140 may be adjusted through the one-side distance adjustment means 126a and a distance between the other side 132 of the upper roll 130 and the other side 142 of the lower roll 140 may be adjusted through the others-side distance adjustment means 126b, and such adjustment may be independent or linked.

The control part 180 may compare a reference position storage value, which is stored in the memory 181, with respect to a reference position at which the upper roll 130 and the lower roll 140 contact each other with a reference position detection value, which is detected in the pressure detection part 160, at a time point, at which the upper roll 130 and the lower roll 140 contact each other to increase in pressure, to reset and correct the reference position detection value to the reference position at which the upper roll 130 and the lower roll 140 contact each other. Here, for example, the reference position at which the upper roll 130 and the lower roll 140 contact each other may be a position at which the stack 10 is not disposed between the upper roll 130 and the lower roll 140, but the upper roll 130 and the lower roll 140 directly contact each other.

The apparatus for manufacturing the electrode assembly according to an embodiment of the present invention may be further provided with a pressing force detection sensor 170 between the moving part 110 and the upper support part 120 to detect pressing force applied from the moving part 110 to the upper support part 120, thereby transmitting the detected value to the control part 180. Here, the pressing force detection sensor 170 may be provided as, for example, a load cell.

For example, the pressing force detection sensor 170 may be disposed between an upper end of the movable block 122 at the upper support part 120 and an end of the moving shaft 112 moving by the cylinder 111 at the moving part 110. Here, for example, the control part 180 may adjust the pressing force applied to the stack 10 with reference to the pressure value applied from the moving part 110 to the upper support part 120 through the pressing force detection sensor 170.

Referring to FIGS. 1 to 3, in the apparatus for manufacturing the electrode assembly having the above-described configuration according to an embodiment of the present invention, when the electrode 13 and the separator 14 are bonded to each other by applying heat and a pressure while passing between the upper roll 130 and the lower roll 140, the pressure detection part detecting the pressure may be mounted on the lower support part 150 supporting the lower roll 140 to detect the pressure transmitted to the lower roll 140 through the stack by pressing the stack 10 through the upper roll 130. Thus, the control part 180 may control the moving part 110 that transmits the pressing force to the upper roll 130 so that the uniform pressure is applied, thereby realizing the uniform bonding between the electrode 13 and the separator 14.

Also, pressures at both sides of the lower roll 140 disposed below the stack 10 may be detected through the pressure detection part 160, and the detected value may be reflected in the control part 180 to adjust the distance h between the upper roll 130 and the lower roll 140 through the distance adjustment means 126, thereby realizing remarkably uniform bonding and thus realizing uniform quality (adhesion strength). As a result, an electrode assembly 10' in which the uniform bonding of the stack 10 of the electrode 13 and the separator 14 is enabled may be manufactured to prevent the separator 14 from being damaged due to nonuniform bonding, thereby preventing short circuit from occurring in the electrode due to the damage of the separator 14. Therefore, when the electrode assembly 10' is accommodated in a battery case 20 to manufacture a secondary battery 1, impregnation of an electrolyte may increase to manufacture the secondary battery 1 having high quality.

Hereinafter, the electrode assembly according to an embodiment of the present invention will be described.

Referring to FIGS. 2 and 3, an electrode assembly 10' according to an embodiment of the present invention may be the electrode assembly 10' manufactured through the apparatus for manufacturing the electrode assembly according to the foregoing embodiment.

Thus, in this embodiment, contents duplicated with those of the apparatus for manufacturing the electrode assembly according to the foregoing embodiment will be omitted.

The electrode assembly 10' may be a chargeable and dischargeable power generation element and have a structure in which an electrode 13 and a separator 14 are stacked to be combined with each other. Here, the electrode assembly 10' may have, for example, a shape in which a positive electrode 11, a separator 14, and a negative electrode 12 are alternately stacked to be combined with each other.

Hereinafter, a secondary battery according to an embodiment of the present invention will be described.

Referring to FIGS. 2 and 3, a secondary battery 1 according to an embodiment of the present invention comprises an electrode assembly 10' and a battery case 20 accommodating the electrode assembly 10'.

The secondary battery according to an embodiment of the present invention may be a secondary battery 1 comprising the electrode assembly 10' manufactured through the method for the electrode assembly according to the foregoing embodiment. Thus, contents of this embodiment, which are duplicated with those according to the forgoing embodiment, will be omitted or briefly described, and also, differences therebetween will be mainly described.

In more detail, the electrode assembly 10' may be the electrode assembly 10' manufactured through the apparatus for manufacturing the electrode assembly according to the foregoing embodiment. In the electrode assembly 10', an electrode 13 and a separator 14 may be alternately stacked. Here, the electrode assembly 10' may have a shape in which a positive electrode 11, a separator 14, and a negative electrode are alternately stacked to be combined with each other through lamination.

The battery case 20 may comprise an accommodation part 21 in which the electrode assembly 10' is accommodated.

Hereinafter, an apparatus for manufacturing an electrode assembly according to another embodiment of the present invention will be described.

Referring to FIGS. 1, 3, and 4, an apparatus for manufacturing an electrode assembly according to another embodiment of the present invention may comprise an upper roll 130 and a lower roll 140, which press upper and lower portions of a stack 10 in which an electrode 13 and a separator 14 are stacked, an upper support part 120 supporting the upper roll 130, a moving part 110 allowing the upper support part 120 to move, a lower support part 150 supporting both sides of the lower roll 140, a pressure detection part 160 measuring a pressure applied to the lower roll 140, and a control part 180 adjusting a pressure applied to the stack 10.

The apparatus for manufacturing the electrode assembly according to another embodiment of the present invention is different from the apparatus for manufacturing the electrode assembly according to the foregoing embodiment in that an upper roll 130 moves through a control part 180. Thus, contents of this embodiment, which are duplicated with those according to the forgoing embodiment, will be omitted or briefly described, and also, differences therebetween will be mainly described.

In more detail, in the apparatus for manufacturing the electrode assembly according to another embodiment of the present invention, the pressure detection part 160 may be disposed on the lower support part 150 to measure the pressure applied to the lower roll 140, thereby detecting the pressure applied to the stack 10.

A control part 180 may adjust the pressure applied to the stack 10 by reflecting a pressure detection value detected by the pressure detection part 160.

Also, the control part 180 may allow an upper roll 130 to move vertically through the moving part 110 so as to adjust the pressure applied to the stack 10 disposed between the upper roll 130 and the lower roll 140. Here, for a specific example, the control part 180 may adjust the pressing force applied to the upper roll 130 through the pressing means P after the upper roll 130 moves vertically through the vertical moving means S of the moving part 110 to contact the stack, thereby adjusting the pressure applied to the stack 10 disposed between the upper roll 130 and the lower roll 140.

Here, the control part 180 may control an operation of the driving motor 113 of the vertical moving means S and control an operation of the cylinder 111 of the pressing means P to control pressing force of the upper roll 130.

For example, the control part 180 may control the vertical movement and the pressing force of the upper roll 130 in real time through the moving part 110 according to the pressure detection value transmitted from the pressure detection part 160 so that a uniform pressure is applied to the stack 10 through the upper roll 130. That is, the control part 180 may control the pressing force of the upper roll 130 so that the pressure detection value detected by the pressure detection part 160 is constant, not according to a movement value of the moving part, which is inputted in a memory 181. Therefore, the pressing force of the upper roll 130 may be more easily adjusted through the control part 180.

Furthermore, for example, the control part 180 may receive the pressure value from the third pressure detection part 163 to adjust the pressure applied to the stack 10 through the moving part 110 so that the uniform pressure is applied to the stack 10.

Also, the control part 180 may receive an one-side pressure value and the other-side pressure value of the lower roll 140, which are detected from the first pressure detection part 161 and the second pressure detection part 162, to control the one-side distance adjustment means 126a and the other-side distance adjustment means 126b so that the uniform pressure is applied to the stack 10, thereby adjusting distances h between the one sides and between the other sides of the upper roll 130 and the lower roll 140.

While the present invention has been particularly shown and described with reference to exemplary embodiments thereof, it is to be understood that the scope of the present invention is not limited to the apparatus for the electrode assembly according to the present invention, the electrode assembly manufactured therethrough, and the secondary battery. It will be understood by those of ordinary skill in the art that various changes in form and details may be made therein without departing from the spirit and scope of the present invention.

Furthermore, the scope of protection of the present invention will be clarified by the appended claims.

The invention claimed is:

1. An apparatus for manufacturing an electrode assembly having a stack of an electrode and a separator, the apparatus comprising:
   an upper roll and a lower roll configured to press upper and lower portions of the stack, respectively;
   an upper support configured to support the upper roll;
   a mover configured to allow the upper support to move;
   a lower support configured to support both sides of the lower roll;
   a pressure detector provided on the lower support to measure a pressure applied to the lower roll, thereby detecting a pressure applied to the stack; and
   a controller configured to adjust the pressure applied to the stack by reflecting a pressure detection value detected in the pressure detector,
   wherein the pressure detector comprises a first pressure detector configured to detect a pressure applied to one side of the lower roll; and a second pressure detector configured to detect a pressure applied to the other side of the lower roll, and
   wherein the upper support and the lower support are interposed between the mover and the pressure detector.

2. The apparatus of claim 1, wherein the lower support comprises a first support configured to support the one side of the lower roll and a second support configured to support the other side of the lower roll, and
wherein the first pressure detector detects a pressure applied to the first support, and the second pressure detector detects a pressure applied to the second support.

3. The apparatus of claim 2, wherein the lower support further comprises a third support configured to support lower portions of the first support and the second support, and
wherein the pressure detector further comprises a third pressure detector configured to extract a total pressure applied to the stack by detecting a pressure applied to the third support.

4. The apparatus of claim 3, wherein the first pressure detector is disposed between the first support and the third support in a vertical direction, and
wherein the second pressure detector is disposed between the second support and the third support in the vertical direction.

5. The apparatus of claim 3, wherein the lower support further comprises a fourth support configured to support a lower portion of the third support,
wherein the fourth support comprises: a base block disposed under the third support; and a guide that is provided in plurality between the base block and the third support to guide a vertical movement of the third support, and
wherein the third pressure detector is disposed between the third support and the base block.

6. The apparatus of claim 3, wherein each of the first pressure detector, the second pressure detector, and the third pressure detector is provided as a load cell.

7. The apparatus of claim 3, wherein the controller receives a pressure value from the third pressure detector to adjust the pressure applied to the stack through the mover so that a uniform pressure is applied along the stack.

8. The apparatus of claim 1, wherein the controller moves the upper roll vertically through the mover and adjusts the pressure applied to the stack disposed between the upper roll and the lower roll.

9. The apparatus of claim 8, wherein the controller compares a reference position storage value with respect to a reference position at which the upper roll and the lower roll contact each other with a reference position detection value to reset and correct the reference position detection value to the reference position at which the upper roll and the lower roll contact each other,
wherein the reference position storage value is stored in a memory, and
wherein the reference position detection value is detected in the pressure detector at a time point at which the upper roll and the lower roll contact each other to increase in pressure.

10. The apparatus of claim 8, wherein the upper support comprises:
an upper roll support body coupled to both sides of the upper roll;
a moving block disposed to be spaced a predetermined distance from an upper portion of the upper roll support body; and
a connector configured to connect the moving block to the upper roll support body.

11. The apparatus of claim 10, wherein the upper support further comprises a distance adjuster mounted on both sides of a lower portion of the moving block and coupled to both sides of the upper roll support body, and
wherein the distance adjuster comprises one-side distance adjuster coupled to one portion of the upper roll support body and the other-side distance adjuster coupled to the other portion of the upper roll support body.

12. The apparatus of claim 11, wherein each of the one-side distance adjuster and the other-side distance adjuster is provided as an actuator.

13. The apparatus of claim 11, wherein the controller receives one-side pressure value and other-side pressure value, which are respectively detected by the first pressure detector and the second pressure detector, to control the one-side distance adjuster and the other-side distance adjuster so that a uniform pressure is applied along the stack, thereby adjusting distances between the one sides and between the other sides of the upper roll and the lower roll.

14. The apparatus of claim 1, further comprising a bottom support below the lower support,
wherein the pressure detector is attached to the bottom support.

* * * * *